United States Patent [19]

Dickey et al.

[11] 3,943,211

[45] Mar. 9, 1976

[54] METHOD OF PREPARING MAGNESIUM OXIDE SPHEROIDS

[75] Inventors: Clarence A. Dickey; Thomas W. Smoot, both of Atlanta, Ga.

[73] Assignee: Glasrock Products, Inc., Atlanta, Ga.

[22] Filed: June 11, 1973

[21] Appl. No.: 368,725

Related U.S. Application Data

[63] Continuation of Ser. No. 140,779, May 6, 1971, abandoned.

[52] U.S. Cl. .................................................. 264/15
[51] Int. Cl.² ........................................ B29C 23/00
[58] Field of Search ................................. 264/5, 15

[56] References Cited
UNITED STATES PATENTS

| | | | |
|---|---|---|---|
| 3,171,714 | 3/1965 | Jones et al. | 264/15 |
| 3,645,894 | 2/1972 | Krystyniak | 264/15 |

*Primary Examiner*—Robert F. White
*Assistant Examiner*—J. R. Hall
*Attorney, Agent, or Firm*—Lane, Aitken, Dunner & Ziems

[57] ABSTRACT

A method of making sized refractory spheroids of magnesium oxide having consistent electrical resistance properties directly from particulate magnesium ore without crust and substantially free from contaminates by feeding particulate magnesium ore from a supply reservoir into a plasma zone of a plasma generator capable of melting particulate solids from the outside inwardly. The melted particles of the refractory magnesium ore are collected directly from the plasma zone in individual particulate and substantially spherical forms.

3 Claims, 1 Drawing Figure

U.S. Patent  March 9, 1976  3,943,211
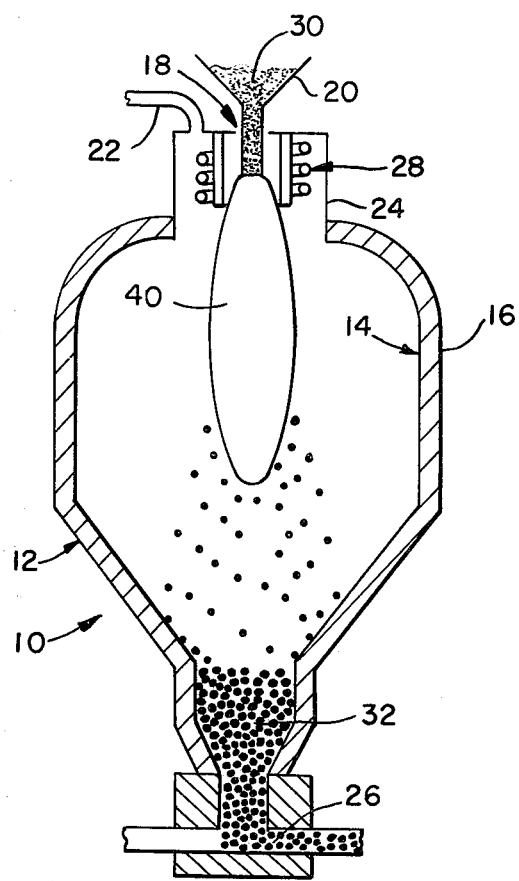

METHOD OF PREPARING MAGNESIUM OXIDE SPHEROIDS

This is a continuation, division, of application Serial No. 140,779 filed May 6, 1971 now abandoned.

BACKGROUND OF THE INVENTION

The advantages of utilizing magnesium oxide as an electrical insulator are well known and because of the many advantages which derive from using this compound, a wide variety of electrical insulators are presently formed from materials which contain a substantial amount of magnesium oxide. One typical prior art procedure for producing such insulators is to introduce a raw material containing magnesium oxide into a three phase electric arc furnace. The raw materials generally used are magnesium ores such as magnesite, periclase, dolomite, kieserite, epsomite, carnalite, asbestos, talc and other minerals. These ores generally are calcined prior to fusion so that in substance the oxides of the ores are fused. The three phase furnace contains an eletric arc located in the center of the furnace to fuse the magnesium oxide.

However, with this apparatus the particulate refractory magnesium oxide ores when heated by the arc form a molten mass which becomes the inner core which is surrounded by a layer of material encapsulating the mass which is generally referred to as the "crust" and "fall-off." Only the portion of the foregoing mass referred to as the core is immediately usable in subsequent stages of the insulator producing process since it is the only part having been completely fused and only in the core have a sufficient amount of impurities been driven off. The crust and fall-off must be removed from the core, and some of it may be recycled back into the electric arc furnace.

The reason why such a mass is formed is that electrically conductive materials tend to form part of the arc circuit, with the result that the material is heated first on the inside and then, as the heat is conducted outwardly of each particle, the outside is heated last. Another result of this inside-outwardly heat transfer is the uneven heating of the particles and, therefore, the material as a whole tends to form a crust of lower quality which acts as a heat insulator to protect the wall from overheating. This crust also tends to trap the impurities in the particles which are vaporized near the center and redeposited (by sublimation) in the cooler crust. This disadvantage also exists in electrically nonconductive materials, such as unfused magnesium oxide, because such materials tend to interfere with the conductivity and enclose the electric arc so as to reduce the heating effect by a reduction in the flow of electric current even to the point of extinguishing the arc on occasions.

In the foregoing prior art process for producing usable insulating particles from magnesium oxide, the core material once cooled is broken with suitable equipment, such as a hammer, or a jaw crusher. The crushed material thereafter is passed into an impactor to produce a substantially pure magnesium oxide material or "grain" as it is commonly called. The grain is then passed through screens to remove oversized particles and is also subjected to a magnetic field which removes any magnetic impurities.

After a series of additional steps, which need not be described in order to understand the present invention, the magnesium oxide is classified into various sizes, blended and packaged for further use.

Since the range of the size of grain produced is advantageously narrower by utilizing the present process as compared to the known prior art processes, a description of the significance of grain size follows.

The ideal magnesium oxide insulator would be composed of 100% pure magnesium oxide particles which may easily and readily be closely packed to produce a very dense pure substance. However, the achievement of such a pure insulator would be an extremely costly process. Therefore, some compromise has to be made as to whether or not to obtain an expensive pure insulating material or as an alternative an acceptable insulating material at a more reasonable cost.

The physical property normally utilized to evaluate the usefulness of a magnesium oxide containing material is density. Although the density of pure magnesium oxide is approximately 3.58, grains of magnesium oxide having a bulk density within the range of between 2.38–2.42 g/cc are usable for forming insulators. A typical range obtainable from the foregoing prior art process is 2.38–2.40 g/cc with 2.38 g/cc being the most common bulk density of the packed grains produced from the foregoing process.

In order to obtain a usable insulating material from the foregoing process, within the foregoing bulk desity range of 2.38–2.42 g/cc, the magnesium oxide grains are classified into various sizes according to minimum cross-sectional dimensions.

The prior art process results in grains with sizes from 40 mesh to less than 325 mesh, (U.S. Sieve Series), making it necessary to blend the grains by particle size, such as in accordance with the following table illustrating a typical blend:

Table 1

| Mesh Size | % of Grain Utilized to Produce Usable Blend |
| --- | --- |
| 40 | 20 |
| 50 | 15 |
| 60 | |
| 80 | 52 |
| 200 | |
| 325 | 8 |
| <325 | 5 |
| | 100 |

It is, of course, desirable to provide a process wherein the size of the grain produced is within a narrower range and where substantially all of the grains produced in the melting step can be used to form insulators. It is also desirable to reduce the number of particle size-reduction steps in the foregoing process, notably the hammering, crushing and impacting steps and yield a material from which insulators could be formed.

A further disadvantage which results from utilizing electric arc type furnaces is that the arc is developed between the electrodes and thus does not extend beyond this very limited area. A still further disadvantage of electric arc melting is that incomplete combustion of the carbon electrodes permits introduction of carbon as an impurity to the solidified fused magnesia, which impurity would have to be oxidized out in a post-fusion step to obtain the highest quality insulation.

It has been suggested that a flame type apparatus would overcome the disadvantage of the electric arc furnace created by the limited heating area of the arc. The word "flame" has been used in this art to denote the heating zone produced by one or more gases, as contrasted with the word "furnace" used to refer to an electric arc device. However, a flame type apparatus has a temperature limitation which renders it impractical. The hottest flame type apparatus has been the oxygen-acetylene combination, and the temperature achieved by it is limited to about 5,000° F. Somewhat higher temperatures may be achieved by other gas combinations, or by preheating the fuels, but those generally are not available commercially and are uneconomical.

Many other devices have been proposed for overcoming the limited heating area disadvantage of the electric arc. However, such devices also have not been particularly effective or commercially feasible.

Therefore, the electric arc apparatus has been and still is the principal source of the heat required for producing fused magnesium oxide for electrical insulators.

In any fusion process for producing high quality fused magnesium oxide, regardless of the type of furnace used, the system must be capable of fusing the material and maintaining the particulate nature of the material. Furthermore, fusing must be accomplished without contamination from carbon and must result in the production of a grain wherein each grain has substantially the same chemical composition and consistency of electrical resistance. It should be further possible to fuse a material and obtain a flow characteristic of a liquid.

SUMMARY

The process of the prior art is greatly improved in accordance with the present invention by utilizing the plasma zone of a plasma generator in the melting process. By melting in a plasma zone the fused material may be utilized directly after leaving the plasma zone where it is thereafter classified and blended. Furthermore, by melting in a plasma zone, it is possible to obtain an acceptable density, i.e. 2.38–2.40 g/cc of magnesium oxide and produce grains within the range of 40 to 325 mesh, but with a majority within the range of 80 to 200 mesh.

Accordingly, it is an object of the present invention to provide a novel method of producing an insulating material from magnesium oxide.

It is a further object of the present invention to provide a method for fusing magnesium oxide to form a particulate material.

It is a still further object of the present invention to provide a fusion process for magnesium oxide which results in a material which is substantially free from carbon.

It is an even further object of the present invention to provide a fusion process whereby grains are produced which have substantially identical chemical compositions and a constant electrical resistance.

It is another object of the present invention to provide a fusion process wherein particulate materials will be fused and result in a material having the flow characteristics approaching that of a liquid.

It is yet another object of the present invention to provide a process producing grains of magnesium oxide where the size of the majority of the grains produced is between the range of eighty and two hundred mesh.

A still further object of the present invention is to provide a fusion process for producing refractory spheroids of magnesium oxide without the necessity of hammering, crushing, impacting or performing other steps necessary to yield a material of suitable size.

Another object of the present invention is to provide a fusion method whereby each individual grain is fused independently, causing volatilized impurities to escape without being entrapped or redeposited on adjacent grains.

Yet another object of the present invention is to provide a process for producing spheroids of magnesium oxide wherein the spheroids are collected directly from the heating zone and are in individual and particulate form.

An important object of the invention is to provide a fusion method by which substantially all of the raw material is fused, eliminating crust and fall-off that collect impurities.

It is still another object of the invention to provide a fusion method for producing magnesium oxide spheroids in which lower melting contaminants tend to be concentrated at the center of each particle, the exterior being a high purity zone of magnesium oxide with improved electrical resistance and melting point.

BRIEF DESCRIPTION OF THE DRAWING

The sole FIGURE of the drawing is a schematic diagram illustrating the process of the present invention.

DESCRIPTION OF THE PREFERRED EMBODIMENTS

The present invention is a method of producing sized refractory spheroids of magnesium oxide and includes the step of feeding particulate magnesium ore into a plasma zone of a plasma generator. The term "plasma" as used in this art is a term which describes the phenomena which occurs when an electric arc is discharged in an ionized gas. The result of such a discharge is an intensely hot flame commonly termed a plasma. In the ordinary plasma, generator gases which are heated electrically with an arc are blown through an container that surrounds the arc.

A typical conventional plasma generator which may be employed for melting the magnesium oxide containing material in accordance with the present invention is shown in the sole figure of the drawing which uses an intense electromagnetic field to heat gases without hot electrodes. The basic advantages of the generator, from the standpoint of heating solids and gases, include absolute freedom from contamination. Since no electrodes are used the materials of the generator itself can remain at water cooled temperatures. Also, the walls can be constructed of almost any material, ranging from quartz to nickel, hence, reactive gases can be handled with ease. In addition, this generator produces relatively large arc diameters. These large diameters result in velocities as low as 1–2 ft./sec. and concomitantly long residence time.

It should be understood, however, that other plasma generators are suitable for use in the present invention such as the subject of U.S. Pat. No. 2,922,869, U.S. Reissue No. 25,088 and U.S. Pat. No. 3,560,074, the teachings of which are incorporated herein by reference. However, the electromagnetic field type generator or radio frequency (RF) plasma generator are advantageously employed because they do not require the use of electrodes and thus carbon-free magnesium oxide of extremely high purity results.

Magnesium oxide can be introduced into the plasma generator by various means depending on the form of the generator in use. The essential requirement is that the magnesium oxide is melted from the outside inwardly in the generator and then rapidly, and as uniformly as possible, cooled. When an RF generator is employed the magnesium oxide is conveniently passed down the whole length of a vertically mounted plasma generator and can be fed into the top of the generator using a vibrator feeder or entrained in a plasma forming or carrier gas.

When a direct current (d-c) or low frequency alternating current (a-c) plasma generator is employed having electrodes the magnesium oxide may be introduced into the arc or into a zone in the tail flame sufficiently hot to melt the magnesium oxide. Again the magnesium oxide may be fed to the generator using a vibrator and/or entrained in a gas feed.

The controlled cooling can be achieved by feeding into the tail flame of the generator carrying the vaporized magnesium oxide a sufficient quantity of cooling gas to ensure rapid and uniform cooling of the magnesium oxide to produce the spherical particles. Care must be taken to ensure that no undue back pressure is induced into the generator and conveniently the cooling is provided by directing a number of jets of cooling gas from an annular manifold, extending round the path of the tail flame, into the tail flame in its direction of flow and at an angle of about 45° to the axis of the plasma tail flame.

Referring to the drawing, generator 10 is comprised of a collection chamber 12 which is formed of inner wall 14 and outer wall 16. The walls 14 and 16 are spaced so that a coolant such as water may be continuously circulated therethrough. The generator itself has a central opening 18 in the upper portion thereof over which is positioned a hopper 20 for feeding particles into the generator. The generator also contains a conduit 22 for introducing the gases into the generator for the production of the plasma. The upper portion of the generator is fitted with a collar 24 which forms the opening 18. Within the collar is a high frequency induction coil 28. In operation any type of arc forming gas is discharged into the area defined by collar 24 and ionized by induction coil 28 to produce a plasma flame 40 within the plasma generator. While the flame is being produced, irregularly shaped particles of magnesium oxide raw material are fed into the plasma flame by being discharged from the hopper. The intense energy of the plasma flame fuses the irregularly shaped material into particles having substantially spherical forms.

The induction coil 28 of the plasma generator is directly coupled to a radio frequency generator operating at, for example, 4 megacycles per second. At the bottom of the plasma generator there is provided a cooling unit comprising an annular plenum chamber or manifold 26.

In the preferred embodiment of the present invention, collection chamber 12 is about 5 feet in diameter and 16–20 feet high and operates at substantially atmospheric pressure. The plasma is 3 inches in diameter and about 9 inches long.

In operation, after the plasma has formed, magnesium oxide raw material 30 is fed into the generator at a fixed rate. As stated above, the magnesium oxide raw material 30 can be fed into the plasma generator by means of a vibrator feeder. However, for ease of understanding the present invention, a simple hopper 20 is shown in the drawing. In this regard, a feeding means such as a hopper is satisfactory for practicing the present invention. Such a device can be constructed with an orifice of a predetermined diameter which enables the raw material to fall into the generator at a predetermined rate once the hopper is loaded. Alternatively, the feed can be entraled in the plasma forming or carrier gas. In one example, for each pound per hour of feed delivered into the generator, 8 s.c.f.h. (standard cubic foot per hour) of argon was utilized. When the foregoing feed and carrier gas flow rates are utilized, it is advantageous to feed a stabilizer gas made up of oxygen and argon into the generator at 25 s.c.f.h. and 20 s.c.f.h. respectively. When it is preferred to entrail the feed with a carrier gas the generator itself is modified to have an appropriate number of conduits, such as conduit 22 to enable feed entrainment in a gas flow. When the feed rate of raw material is increased, the foregoing gas flow rates are increased proportionally. These features, however, are well recognized by those skilled in the art.

Determination of an appropriate feed rate depends upon three factors. The first factor is the particle size that is being injected into the plasma zone. The second factor is the size of the plasma zone. In this regard, the larger the plasma zone the faster feed can be fed into the generator. The important consideration is that the magnesium oxide material fuses from the outside inwardly vaporizing impurities on the outside of the feed. Thus, for the size of the plasma flame indicated above, i.e. 3 inches in diameter and 9 inches in length and having a temperature within the range of 10,000–30,000° F a feed rate of approximately 40 lb./hr. of magnesium oxide particulate feed stock of a particulate size of 20 mesh and smaller is effective to melt 100% of the feed particles and achieve high purity magnesium oxide spheres having the properties which are the objects of the present invention.

A third factor to be considered is the temperature of the plasma itself. In accordance with the present invention the magnesium oxide particles are effectively treated by being passed through a plasma zone having a temperature within the range of at least 5,000°–30,000° F, with 30,000° F being the preferred temperature of the plasma zone through which the raw material falls. In one case satisfactory results were achieved by melting a particulate magnesium oxide feed stock where the particles were in the order of 20 mesh and smaller by feeding the raw material at a rate of approximately 40 lb./hr. through a plasma zone with a temperature of about 30,000° F. In this case the plasma zone was 3 inches in diameter and 9 inches in length.

In one important embodiment of the invention improved results are obtained when the spheres 32 formed in the plasma generator are cooled in flight. It has been found that in order for effective cooling of the melted magnesium oxide to occur the spheres must be cooled to a temperature of about 5,000° F or less. The distance through which the spheres are allowed to fall should be sufficient to permit the molten spheres to become solid before striking any object which might tend to distort them. This cooling can be accomplished in a number of ways. The most effective way, however, is to allow each sphere to free fall in an ambient temperature for about 1 second before being collected. Cooling may also be accomplished by providing a refrigerated zone for the spheres to fall through. In this embodiment, although the spheres are solidified, the material has flow characteristics approaching that of a liquid.

In one important embodiment of the invention the magnesium oxide spheres are collected on a ceramic plate formed from magnesium oxide. With the utilization of such a magnesium oxide collecting plate, cooling to less than 5,000° F is effective. However, if the chamber 26 is formed of cast iron or some other similar material the magnesium oxide spheres would have to be cooled to a temperature much less than 5,000° F, i.e. about 2,000° F or else some impurities might be picked up by the spheres which are produced in the plasma zone from the chamber itself.

A further feature of the present invention is that the spheres that are formed in the plasma generator can be collected directly by an insulator-forming mold while in a molten state. With this embodiment the flight of the spheres leaving the plasma generator is controlled so that they are still molten when they are collected by the insulator forming mold. Thus, in this embodiment the spheres are only allowed to cool to a temperature of about 6,000° F. This embodiment enables a direct bond of the spheres produced in the plasma zone to achieve the formation of a high purity sintered ceramic formed of magnesium oxide. It is to be understood, however, that it is the formation of the high purity spheres in the plasma generator that enables the production of a direct bonded refractory insulator.

In accordance with the present invention it has been discovered that by utilizing a plasma generator a starting material of relatively poor quality can be utilized. In this regard, such starting material after being crushed into particulate form of 20 mesh or smaller is directly usable as the raw material and results in a high grade insulating material.

As stated above, it is the formation of high purity spheres of appropriate size, a majority being preferably within the range of 80–200 mesh, which enables the production of high purity magnesium oxide grains or the production of a direct bonded magnesium oxide insulator. By following any of the procedures set forth in this specification, such spheres are produced after the feed stock falls through the plasma zone. Any impurities which would normally be present in the outer portions of the spheres which are formed are vaporized and thereby eliminated from the material. Impurities which are in the inner portion of the spheres that are formed, which are not vaporized, are trapped therein due to the sudden temperature drop during free fall and thus do not appreciably affect the utilization of the spheres as grain or as a material for a direct bonded insulator.

In accordance with the present invention the following test was run to determine the percent distribution in mesh size of the spheroids resulting from the process.

The starting material was a Standard Lime Company raw material commonly used for the production of fused magnesium oxide grain. It is to be understood, however, that any starting material commonly used for making magnesium oxide insulators can be utilized in the present process. Thus, the choice of such a starting material forms no part of the invention. The particle size of the raw material was 20 mesh and smaller. The foregoing feed stock was fed into the plasma generator at the rate of 150 g/sec. The generator utilized was a generator similar to the embodiment shown in the drawing with a plasma zone 3 inches in diameter and 9 inches in length. The temperature of the plasma zone was about 30,000° F. The spheroids produced in the plasma zone were allowed to completely solidify in flight. The particle size range of the spheroids produced in this test are shown in the table below:

Table 2

| Mesh Size | % Distribution in Mesh Size of the Spheroids |
|---|---|
| 50 | 0.20 |
| 60 | 0.10 |
| 80 | 28.00 |
| 100 | 35.00 |
| 140 | 26.00 |
| 170 | 5.90 |
| 200 | 2.50 |
| 325 | 2.60 |
| <325 | 0.12 |
| | Total 100.42 |

In addition to the distribution of particle size of the resulting spheroids being greatly improved in accordance with the present invention over the results obtainable using prior art techniques, the bulk density of the resulting spheroids was determined to be greater than 2.38 and the spheroids were carbon free. Thus, by melting the feed material from the outside inwardly as taught herein, the objects of the present invention are achieved.

A comparison of the important properties of the spheroids produced by the present invention with properties which result from a prior art process, both utilizing the same starting material, is given in Table 3 below:

Table 3

| | Fusion by the Present Invention | Fusion by Prior Inside-Out, 3 Phase |
|---|---|---|
| Bulk Packed Density (g/cc) | 2.38 | 2.38 |
| Flow Time in seconds of a 100 gram sample through a 0.086 inch orifice | 150 | 200–205 |
| Electrical Resistance at 822° C (megaohms-in.) | 9.4 | 3.0 |
| Sinter Index | 274 | 500–1000 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of producing sized refractory spheroids of magnesium oxide directly from crushed particulate magnesium oxide containing material, so as to increase the electrical resistivity of said material comprising:
   a. feeding a quantity of said crushed magnesium oxide containing material for a supply reservoir into a plasma zone of a plasma generator capable of melting particulate solids from the outside inwardly;
   b. heating said material in said plasma zone to melt said material from the outside inwardly to form individual particulate substantially spherical shaped spheroids;
   c. cooling said spheroids in flight to about 5,000° F or less to solidify same;

d. collecting said solidified spheroids.

2. The method as claimed in claim 1 wherein the size of the particulate magnesium oxide is 20 mesh or smaller and wherein the majority of the spheroids formed are in a size range between 80–200 mesh.

3. The method as claimed in claim 1 wherein the temperature of the plasma zone is in the range of 5,000°–30,000° F.

* * * * *